US011422920B2

(12) United States Patent
Grover

(10) Patent No.: US 11,422,920 B2
(45) Date of Patent: Aug. 23, 2022

(54) DEBUGGING MULTIPLE INSTANCES OF CODE USING THREAD PATTERNS

(71) Applicant: MICRO FOCUS LLC, Santa Clara, CA (US)

(72) Inventor: Douglas Grover, Elk Ridge, UT (US)

(73) Assignee: Micro Focus LLC, Santa Clara, CA (US)

(*) Notice: Subject to any disclaimer, the term of this patent is extended or adjusted under 35 U.S.C. 154(b) by 200 days.

(21) Appl. No.: 16/817,113

(22) Filed: Mar. 12, 2020

(65) Prior Publication Data

US 2021/0286702 A1 Sep. 16, 2021

(51) Int. Cl.
*G06F 11/36* (2006.01)

(52) U.S. Cl.
CPC ........ *G06F 11/364* (2013.01); *G06F 11/3632* (2013.01)

(58) Field of Classification Search
None
See application file for complete search history.

(56) References Cited

U.S. PATENT DOCUMENTS

| 8,578,340 | B1 | 11/2013 | Daudel | |
|---|---|---|---|---|
| 8,752,022 | B2* | 6/2014 | Bates | G06F 11/3632 717/129 |
| 9,122,800 | B1* | 9/2015 | Huddar | G06F 11/3664 |
| 10,169,194 | B2 | 1/2019 | Chandra et al. | |
| 10,223,236 | B2 | 3/2019 | Carey et al. | |
| 10,379,887 | B2* | 8/2019 | Spracklen | G06F 9/52 |
| 10,474,565 | B2 | 11/2019 | Kornfeld et al. | |
| 2003/0005417 | A1* | 1/2003 | Gard | G06F 11/3656 717/135 |
| 2003/0200098 | A1* | 10/2003 | Geipel | G06F 8/71 717/121 |
| 2012/0110556 | A1* | 5/2012 | Bates | G06F 11/362 717/129 |

(Continued)

OTHER PUBLICATIONS

L. DeRose et al., "Relative debugging for a highly parallel hybrid computer system," SC '15: Proceedings of the International Conference for High Performance Computing, Networking, Storage and Analysis, 2015, pp. 1-12, doi: 10.1145/2807591.2807605. (Year: 2015).*

(Continued)

*Primary Examiner* — Andrew M. Lyons

(57) ABSTRACT

This document describes debugging multiple instances of code by detecting a variance in thread patterns of threads of execution relative to the multiple instances of executing code. A first instance of the code is executed and a first thread pattern is identified indicative of a first plurality of threads of execution of the first instance of the code. A second instance of the code is executed, the second instance of the code beginning executing prior to the first instance of the code completing executing, and a second thread pattern is identified indicative of a second plurality of threads of execution of the second instance of the code. A comparative representation of the first thread pattern and the second thread pattern is generated relative to each other. A variance between the first thread pattern and the second thread pattern relative to the comparative representation is identified, the variance typically being indicative of a bug in the code.

20 Claims, 5 Drawing Sheets

(56) References Cited

U.S. PATENT DOCUMENTS

| | | | | |
|---|---|---|---|---|
| 2012/0159451 | A1* | 6/2012 | Bates | G06F 11/3664 |
| | | | | 717/125 |
| 2014/0146062 | A1* | 5/2014 | Kiel | G06F 11/362 |
| | | | | 345/522 |
| 2014/0310714 | A1* | 10/2014 | Chan | G06F 16/285 |
| | | | | 718/102 |
| 2016/0062874 | A1* | 3/2016 | Brites | G06F 11/3636 |
| | | | | 717/129 |
| 2016/0140020 | A1* | 5/2016 | Cocks | G06F 11/3636 |
| | | | | 714/38.1 |
| 2016/0196135 | A1* | 7/2016 | Mavinakayanahalli | G06F 8/71 |
| | | | | 717/170 |
| 2018/0024911 | A1 | 1/2018 | Kruszewski et al. | |
| 2019/0034259 | A1 | 1/2019 | Jiang | |
| 2019/0213108 | A1 | 7/2019 | Cheng et al. | |

OTHER PUBLICATIONS

S. Park, R. W. Vuduc and M. J. Harrold, "Falcon: fault localization in concurrent programs," 2010 ACM/IEEE 32nd International Conference on Software Engineering, 2010, pp. 245-254, doi: 10.1145/1806799.1806838. (Year: 2010).*

S. Taheri, I. Briggs, M. Burtscher and G. Gopalakrishnan, "DiffTrace: Efficient Whole-Program Trace Analysis and Diffing for Debugging," 2019 IEEE International Conference on Cluster Computing (Cluster), 2019, pp. 1-12, doi: 10.1109/cluster.2019.8891027. (Year: 2019).*

Debugging Common Issues in Multithreaded Applications; Rogue Wave Software; 34 pages; 2013.

* cited by examiner

DEBUGGING MULTIPLE INSTANCES OF CODE USING THREAD PATTERNS

BACKGROUND

Debugging a software program includes finding and resolving problems (bugs) in the software that prevent correct operation of the software (code). Debugging code can be a tedious and frustrating task. For example, a coding bug may only manifest itself intermittently during execution of the program as a process in a computing system. In some cases, the program may work properly one time, but fail upon executing the next time.

A debugger is a software tool that allows for the execution of code to be monitored, stopped, and restarted, and allows for setting breakpoints, and changing values in memory to facilitate the finding and resolving of bugs in the code. Even if a coding debugger is involved to identify a bug, the bug that generated the error may actually occur long before symptoms associated with the bug becomes visible (e.g., a system crash or a Java exception). These types of coding bugs are very difficult to detect and can take extensive resources and time to actually identify the specific code that produced the bug.

DETAILED DESCRIPTION

This document describes example methods, devices, and computing systems to debug code executing in multiple instances by comparing variances in threads of execution relative to the multiple instances. A first instance of code is executed on a computing device, and a first thread pattern is identified indicative of a first plurality of threads of execution of the first instance of the code. A second instance of the code is executed, with the second instance of the code beginning executing prior to the first instance of the code completing executing. A second thread pattern is identified indicative of a second plurality of threads of execution of the second instance of the code. A comparative representation of the first thread pattern and the second thread pattern is generated relative to each other. A variance is identified between the first thread pattern and the second thread pattern relative to the comparative representation, the variance typically being indicative of a bug in the code.

The system and/or operations of methods described in this disclosure may be embodied in whole or in part as programming instructions, such as firmware or software. The instructions may be stored on a non-transitory, machine-readable (e.g., computer/processor-readable) medium, such as a random-access memory (RAM), read-only memory (ROM), flash memory, cache memory, solid-state drive (SSD), hard disk drive (HDD), or combinations thereof, for execution on a processor in a computing system. In some examples, implementing the operations of these methods may be achieved by one or more processors, or processor cores, reading and executing the programming instructions stored in the memory. In other examples, implementing the operations of the methods may be achieved using an application-specific integrated circuit (ASIC), such as a system-on-chip (SOC), and/or other hardware components either alone or in combination with programming instructions executable by one or more processors in a computing system.

The example methods described in this disclosure may include more than one implementation, and different implementations may not employ every operation presented in a respective flow diagram, or may employ additional steps not shown in the respective diagram. Therefore, while the operations of methods are presented in a particular order within the flow diagrams, the order of their presentations is not intended to be a limitation as to the order in which the operations may actually be implemented, or as to whether all of the operations may be implemented. For example, one implementation might be achieved through the performance of a number of initial operations, without performing one or more subsequent operations, while another implementation might be achieved through the performance of all of the operations.

Figure 1:
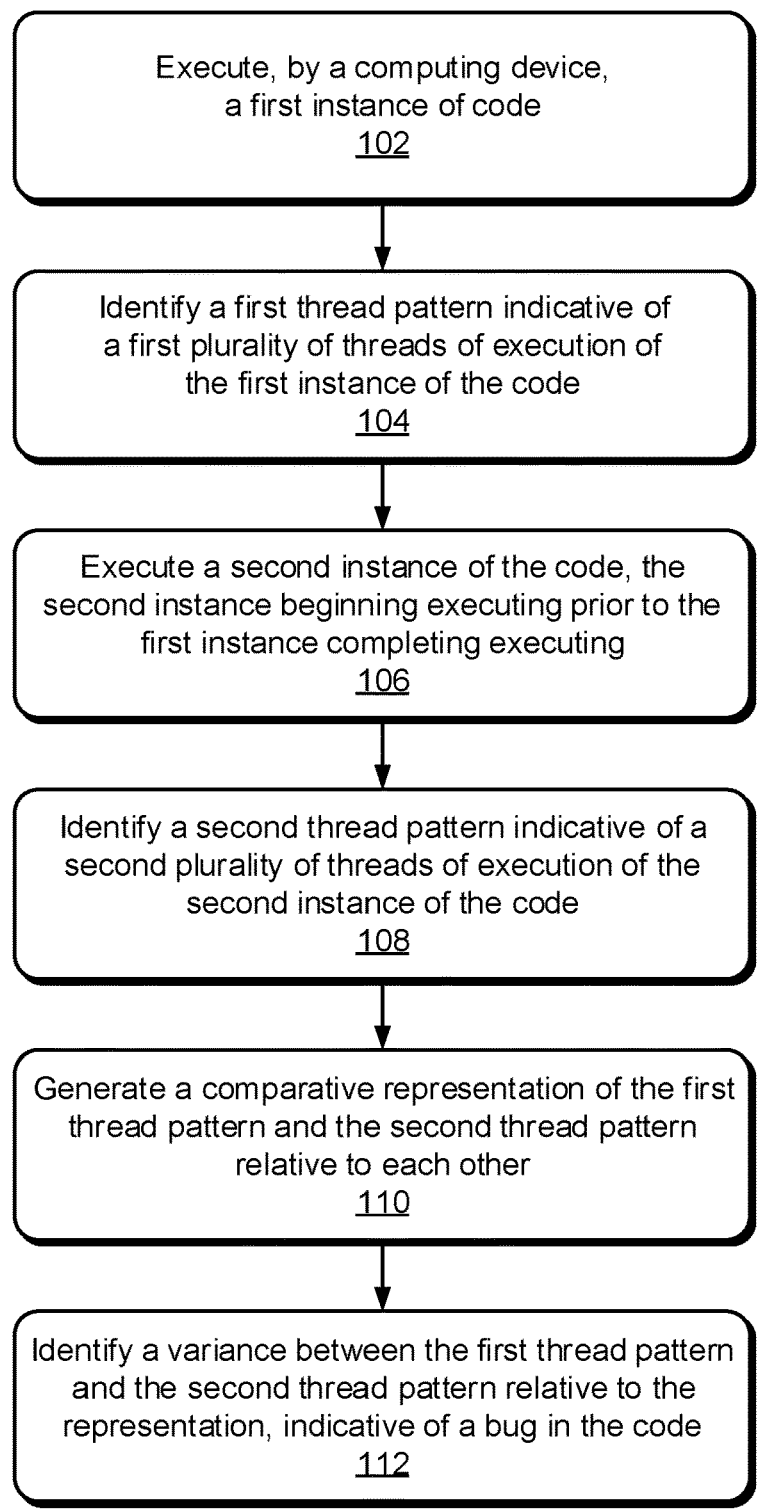
FIG. 1 is a flow chart illustrating an example method of debugging code using thread patterns relative to multiple instances of execution of the code.

FIG. 1 is a flow chart illustrating an example method 100 of debugging code using thread patterns relative to multiple instances of execution of the code. These multiple instances of execution of code may occur, for example, in a web browser application that runs each browser window as a separate process. In this context, multiple instances of the same program are run as separate processes at substantially the same time (e.g., in parallel). At 102, a first instance of code (e.g., a software application) is executed by a computing device. At 104, a first thread pattern is identified, the first thread pattern being indicative of a first plurality of threads of execution of the first instance of the code. At 106, a second instance of the code is executed, the second instance beginning executing prior to the first instance completing executing. The second instance of the code may occur on the same computing device, or separate computing device. The execution of the first and second instances of the code (102/106) may be accomplished by separate instances of a test program. The separate instances of the test program may comprise execution of separate instances of a set of automated test scripts/systems/apparatuses that are coordinated for parallel testing. For example, a series of client devices that have the separate instances of the test program may be coordinated to test a server that has separate instances (e.g., different virtual machines) of the code that is being executed.

At 108, a second thread pattern is identified, the second thread pattering being indicative of a second plurality of threads of execution of the second instance of the code. At 110, a comparative representation of the first thread pattern and the second thread pattern is generated relative to each other. At 112, a variance is identified between the first thread pattern and the second thread pattern relative to the comparative representation generated. This variance may be indicative of a bug in the code, or at least a possible identification of code that may be causing a problem during execution, and enables a user to take additional debugging steps relative to the variance or any threads of execution to more specifically identify the bug in the code.

Figure 2:
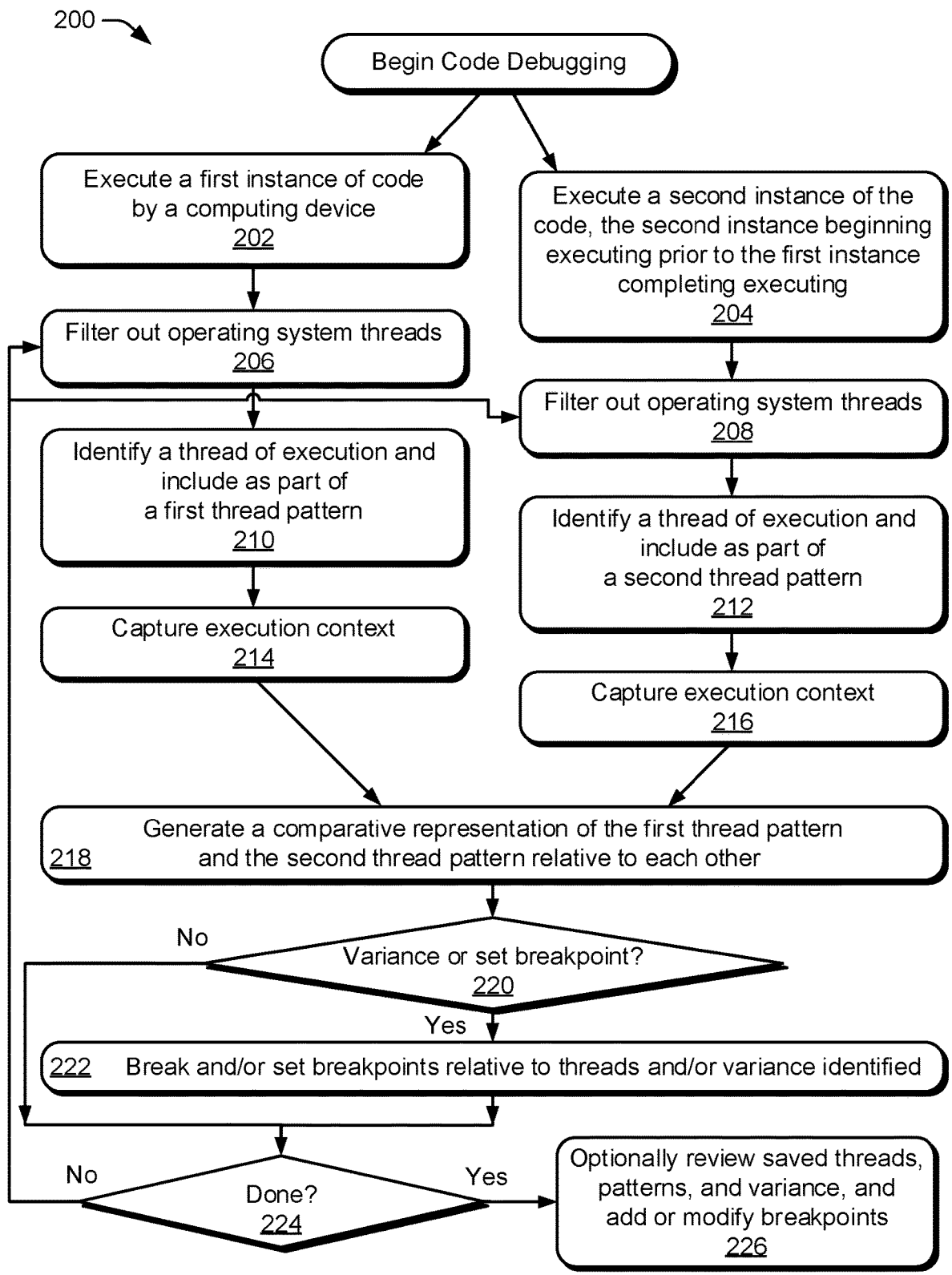
FIG. 2 is a flow chart illustrating another example method of debugging code using thread patterns relative to multiple instances of execution of the code.

FIG. 2 is a flow chart illustrating another example method 200 of debugging code using thread patterns, with this example highlighting multiple instances of the code executing in parallel as well as additional debugging features and contexts. At 202, a first instance of code is executed by a computing device. At 204, a second instance of the code is executed, the second instance beginning executing prior to the first instance completing executing. The second instance may execute relative to the first instance either synchronously, or asynchronously, provided the second instance begins executing prior to the first instance completing its execution. In this context, the first and second instances will be referred to generally in this disclosure as executing in "parallel." The first and second instances of the code may be executed on the same processor, on a same processor core, on different cores of the same processor, on different processors, on a same or different virtual machines, on a client device, on a server device, in a client-server context, using a distributed computing system environment, or any combination thereof.

In an example embodiment of a client/server context, the first instance of code includes a first client instance executing on a first client computing device, and a first server instance of code executing on a first server computing device. Similarly, the second instance of code includes a second client instance of the code executing on a second client computing device, and a second server instance of code executing on a second server computing device. In another example embodiment, the first and second client computing devices may be the same client computing device, and the first and second server computing devices may be the same server computing device. Moreover, the first instance of code and the second instance of the code may represent a same version of the code, or may represent different versions of the code. Although this example method 200 illustrates only two instances of the code executing, multiple instances of the code may execute under principles of this disclosure in parallel, synchronously or asynchronously.

At 206, operating system related threads of execution may be filtered out relative to the first instance of the code. Similarly, at 208, operating system related threads of execution may be filtered out relative to the second instance of the code. This filtering allows the relevant threads of execution of each instance of the code to be specifically identified and captured for debugging purposes. Operating system threads that may be filtered out are those that are part of the operating system (e.g., kernel level threads) that are common threads used to manage applications that run in the user space. These types of threads may include background processes, such as, Java garbage collection, memory management, file I/O, and/or the like. In one embodiment, the user has the ability to select specific operating system threads (or any thread or group of threads) to be filtered out.

At 210, a first thread of execution is identified and included as part of a first thread pattern indicative of a first plurality of threads of execution of the first instance of the code. At 212, a second thread of execution is identified and included as part of a second thread pattern indicative of a second plurality of threads of execution of the second instance of the code. In an example client/server context, the first thread pattern 210 includes threads resulting from a first client instance of the application code executing on a client computing device, and threads resulting from a first server instance of the application code executing on a server computing device. The threads from both the first client and server instances are coordinated together and identified as the respective first thread pattern. Similarly, the second thread pattern 212 includes threads resulting from a second client instance of the application code executing on a client computing device, and threads resulting from a second server instance of the application code executing on a server computing device. Again, the threads from both the second client and server instances are coordinated together and identified as the respective second thread pattern.

At 214, execution context information is captured relative to the thread of execution and thread pattern for the first instance of the code. At 216, execution context information is captured relative to the thread of execution and thread pattern for the second instance of the code. The execution context information may include any number of data and code processing or operating system and related environment information, such as parameters passed, stack data (e.g., stack variables), function calls, identification of specific aspects of the code that called a thread, data transmitted, data received, objects, register content, or any combination of these or other information.

At 218, a comparative representation of the first thread pattern and the second thread pattern is generated relative to each other. In the initial stages of this debugging process, each thread pattern may only include one or two threads, but as debugging continues, each thread pattern may contain a plurality of threads relative to each of the first and second instances of execution. This comparative representation (e.g., displayed via a graphical user interface) may be in the form of a table, matrix, linear configuration, or other format, provided it allows for understanding and comparing the first and second thread patterns (and/or additional thread patterns relative to any additional instances of the code) relative to each other for identifying any variances between the thread patterns. At 220, the comparative representation generated of the first and second thread patterns is analyzed to identify a variance between the patterns. This variance may be indicative of a bug in the code, or at least a possible identification of code that may be causing a problem during execution.

At 222, if a user previously set a breakpoint relative to the variance, or has set a breakpoint relative to any thread(s) identified in the thread patterns, execution will break (pause) in either one or both instances of the code relative to the breakpoint for further analysis. This allows the user to view the context information for both instances of the code to debug the thread variance. The user could then single step through the thread patterns. Notably, the user can set a breakpoint for the variance or any thread at any time. For example, the user could set a breakpoint for the variance (e.g., the first variance or all instances of variances), or for any specific thread, before the process of FIG. 2 begins or any time after the process of FIG. 2 starts.

Also at 222, additional debugging breakpoints may optionally be set (e.g., by a user) relative to the threads and/or variance(s) identified. For example, a breakpoint may be set by the user relative to any thread(s) identified in the thread patterns, either at the beginning or end of the thread (or both), and for either one or both of the first and second instances of the code. The execution context information relative to the variance, thread patterns, and/or individual threads may also be displayed for improved debugging. This real-time thread analysis and breaking based on the variance and/or individual threads, for one or both of the first and second instances of the code, or for as many instances of the code as may be executing, allows the code to be stopped or paused for specific debugging purposes relative to any thread and/or variance identified in the threads patterns. It also allows for further evaluating of the captured execution context information 214, 216, and general environment status, registers, memory, files, and other aspects relevant to the threads of execution.

At 224, if the code debugging is not done (not completed), then the previously discussed processes are repeated relative to the first and second instances of the code (e.g., filtering out operating system threads 206, 208, identifying a thread of execution and including it as part of a thread pattern 210, 212, capturing execution context information for each thread of execution 214, 216, generating a comparative representation 218, identifying a variance and setting breakpoints 220, 222). These processes are typically performed in real-time for each thread that is generated for each instance of the code 202, 204, and the processes are repeated for each detected thread associated with that specific instance. Additionally, the data associated with each of these process steps (e.g., threads, thread patterns, variance, breakpoints) are optionally saved to memory or non-volatile storage for subsequent review (e.g., review that is outside of a real-time execution context), analysis, breakpoint setting, single stepping, and/or the like.

If debugging is done (completed) 224, then at 226 a user is provided the option to review and/or modify the saved data (e.g., threads, thread patterns, variance, breakpoints, etc.) associated with each of these process steps. In this context, once a debugging test has been run (is done), the user may then look at a thread or thread pattern and set a new breakpoint (e.g., in the first instance, or the second instance, or other additional instances) at the same thread or at different threads for each instance. For example, the user could set a new breakpoint to occur based on the N occurrence of thread Y in the first instance of code. In another example, one or more instances of code would stop execution based on the first execution of the specific thread in any instance of code. The user could also set a breakpoint for when instances of the same thread execute in all instances of the code. As an example, if there were two instances of the code being tested, the system would break when the same instance of the thread first executes in both instances. The user could also set a breakpoint for when the thread executes a certain number of times in all instances, or set breakpoints on different threads in each instance. For example, the user may set a breakpoint on thread one in instance one and set a breakpoint on thread two in instance two. Alternatively, the user could delete or modify an existing breakpoint relative to the saved threads, patterns, or variance.

Figure 3:
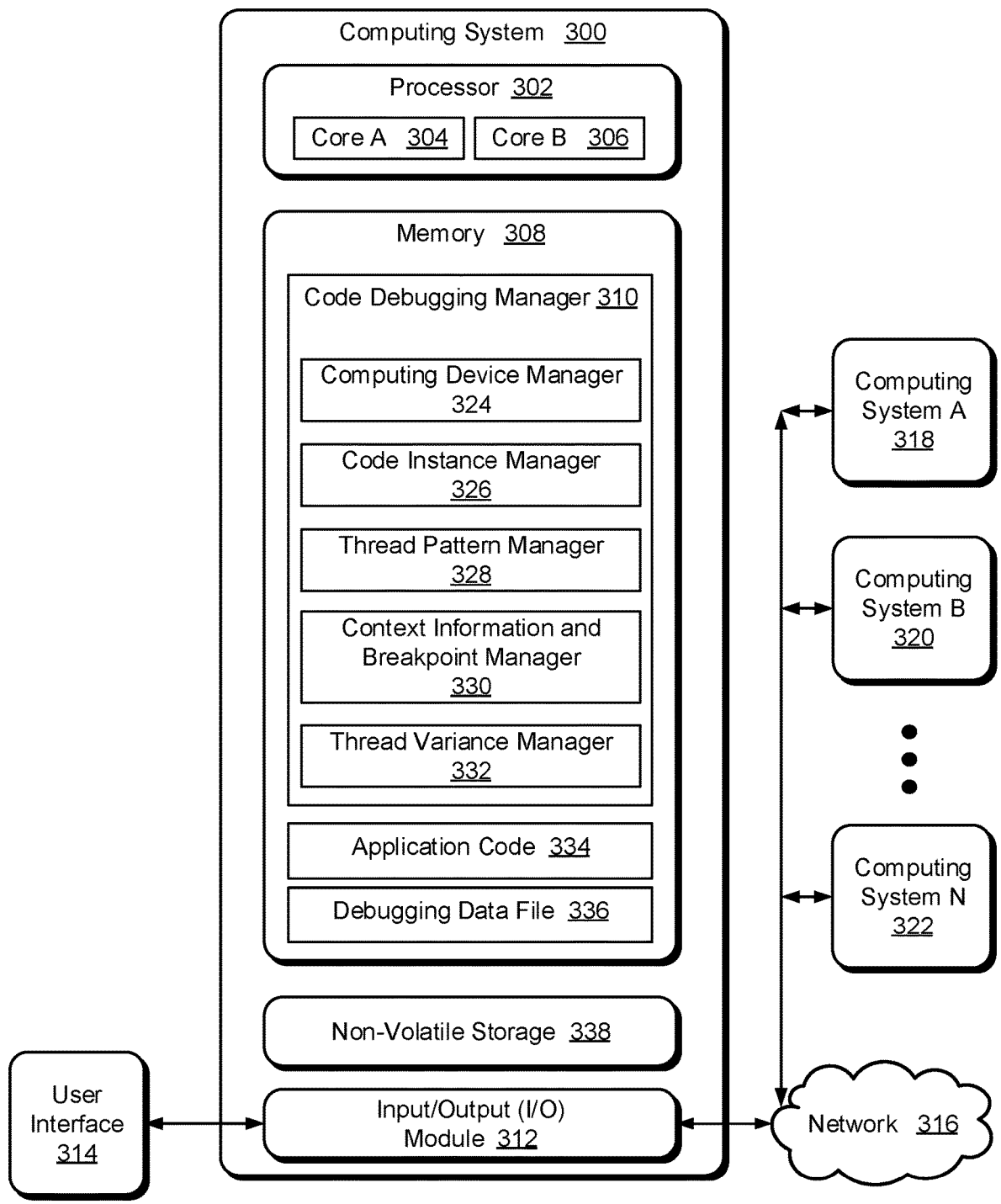
FIG. 3 is a block diagram of an example computing system having a code debugging manager for debugging code using thread patterns relative to multiple instances of execution of the code.

FIG. 3 is a block diagram illustrating an example computing system 300 having a code debugging manager 310 that functions according to methods and principles as described in this disclosure for debugging code using thread patterns relative to multiple instances of execution of the code. The computing system 300 includes a processor 302 having processor core A 304 and processor core B 306, a computer-readable media (memory) 308, the code debugging manager 310 stored in the memory 308, an input/output (I/O) module 312, and non-volatile storage 338 (e.g., a HDD or SSD). The computing system communicates with a user interface 314 and a network 316 by way of the I/O module 312. As some non-limiting examples, the computing system 300 may be a server, desktop computer, notebook computer, mobile device, handheld device, mobile phone, or other computer device. The processor 302 may be any central processing unit (CPU) with one or more cores although only two cores 304, 306 are shown. The memory 308 may be any non-transitory, machine-readable (e.g., computer/processor-readable) medium, such as a RAM, ROM, cache, SSD, or a combination thereof, for storing program files, data, an operating system, and other executable instructions.

The user interface 314 may be a display, monitor, screen, touch screen, keyboard, mouse, other input or output device, or any combination configuration of these devices to display or otherwise provide information from the computing system to a user, and to allow the user to input information into the computing system. The network 316 may be any local area network (LAN), wide area network (WAN), cloud, multi-cloud, hybrid cloud, or private on-premise cloud computing environment. Computing system 300 may also communicate, via the I/O module 312 and network 316, with other networked computing systems 318, 320, 322. These other networked computing systems have computing constructs such as processor functionality, memory, and other computing system components, to enable independent computing system environments such as client systems, server systems, data storage systems, or combination systems, communicating via the network 316. These networked computing systems may likewise include a copy (instance) of code debugging manager 310 to enable functionality in a distributed network environment via the network 316.

The code debugging manager 310 includes instructions for debugging code using thread patterns relative to multiple instances of the code executing in parallel. Variances in threads patterns relative to the multiple instances are identified to debug the code being executed. For example, a first instance of application code 334 is executed on a computing device (e.g., processor 302, core A 304), and a first thread pattern is identified indicative of a first plurality of threads of execution of the first instance of the code. A second instance of the application code 334 is also executed (e.g., on processor 302, core B 306), with the second instance of the code beginning executing prior to the first instance of the code completing executing. A second thread pattern is identified indicative of a second plurality of threads of execution of the second instance of the code. A comparative representation of the first thread pattern and the second thread pattern is generated relative to each other. A variance is identified between the first thread pattern and the second thread pattern relative to the comparative representation, the variance typically being indicative of a bug in the code.

In this example, the code debugging manager 310 is depicted simply as executable instructions, such as firmware or software, for execution on the processor 302 (e.g., one or more of the processor cores 304, 306). However, the operations of the code debugging manager 310 may be implemented in whole or in part using an ASIC, such as a system-on-chip (SoC), and/or other hardware components either alone or in combination with programming instructions executable by the processor. The code debugging manager 310 includes manager-modules such as computing device manager 324, code instance manager 326, thread pattern manager 328, context information and breakpoint manager 330, and thread variance manager 332. These manager-modules are shown separately in the illustration for discussion purposes, but may be combined, or further separated into additional modules, according to design and functional preference.

The computing device manager 324 coordinates communications and data sharing between the networked computing systems 318, 320, 322 that are executing other copies (instances) of the code debugging manager 310. The code instance manager 326 coordinates communications and data sharing between instances of the software program (application code) 334 that are executing under code debugging manager 310 for debugging purposes. For example, if a first instance of the application code 334 is executing on processor core A 304, and a second instance of the application code 334 is executing on processor core B 306, and a third instance of the application code 334 is executing on networked computing system A 318, then code instance manager 326 coordinates the communications and data sharing relative to each of the instances of execution. This may include address and resource information identifying the relevant computing device executing the instance (e.g., processor core, processor, client, server, distributed or networked computing system) that is executing the instance. It may also include timing information (e.g., when did each instance begin and end execution). For example, code instance manager 326 identifies when a first instance of the application code 334 begins executing on core A 304, and whether and when a second or third instance of the code begins executing on core B 306, or on computing system A 318, prior to the first instance of the code completing executing on core A 304.

The thread pattern manager 328 monitors each instance of execution of the application code 334 and identifies a thread pattern indicative of a plurality of threads of execution of each instance of the code. For example, if one instance is executing on core A 304, and a second instance is executing on core B 306, then thread pattern manager 328 monitors each instance and identifies a thread pattern relative to each instance. Thread pattern manager 328 may also be configured to filter out any threads of execution of operating system code or other system or application code unrelated to application code 334 that is executing on the computing system. For example garbage collection in Java can be filtered out from the thread pattern. This way, only threads associated with the application code 334 under test will be part of the thread pattern. This allows the thread pattern manager 328 to focus on the threads of execution relevant to the application code 334. The user interface 314 allows a user to select specific threads (or groups of threads) that can be filtered from the thread pattern, narrow down the number of threads that may be in a thread pattern if there is too much thread information, select threads generated after a specific thread or time, only include threads that are actually generated from the application code 334 being tested, and/or the like.

After optional filtering, thread pattern manager 328 can function such that a first thread pattern of the code is identified relative to a first instance of execution of the code, a second thread pattern is identified relative to a second instance of execution occurring in parallel, and a third thread pattern may be identified relative to a third instance of code executing in parallel, and so forth, for each instance of execution of the code being monitored. Central processing unit (CPU) analysis tools may be used to facilitate in identifying threads, thread patterns, and related processing metrics. For example, the Windows Performance Analyzer (WPA) from the Window Performance Toolkit (WPT) may be considered, or the Java jstack tool or JVisualVM tool in the Java Virtual Machine (JVM) environment, or other thread dump command line tools.

The thread pattern manager 328 generates a comparative representation of each thread pattern for comparison relative to each other thread pattern. This is typically done in real-time (but does not have to be). The comparative representation of each thread pattern may be in the form of a table, matrix, linear configuration, or other format sufficient to represent the thread patterns, and may include descriptive information including computing device identification (e.g., core, processor, computing system, client/server configuration), thread identification (e.g., T1, T2, . . . TN), stack trace information for each thread (e.g., variables placed on and taken off the stack), thread timing information (e.g., start time, stop time, and/or duration for each thread), and/or the like. This comparative representation may be maintained in volatile memory 308, such as in a debugging data file 336, or the debugging data file 336 may be stored on non-volatile storage 338 for later retrieval, comparison, and usage.

Although the application code 334 may represent a single version of the application code, different versions of the application code (e.g., V1, V2 . . . VN) may be stored in the memory 308 as separate files or copies (not shown) for executing and debugging, with a plurality of threads of execution being identified relative to each of the different versions executing. Different versions means actual differences or modifications (e.g., updates or upgrades) in the application code relative to each version. In this context, a first version of the application code (V1) 334 may be executed as a first instance on core A 304, generating a first plurality of threads of execution. Similarly, a second version of the application code (V2) may be executed as a second instance on core B 306, generating a second plurality of threads of execution. Alternatively, the same version of the application code 334 may be executed as two separate instances, both on a single core, or one instance on each core.

If the application code 334 is identified to have passed a current or prior execution test, or if a different version of the code is identified to have passed a prior execution test, that information may be captured by the code instance manager 326 or context information and breakpoint manager 330 to assist in the debugging process. This may simplify the subsequent analysis of thread patterns by thread variance manager 332. The application code 334 that is identified to have passed an execution test may serve as a base reference or benchmark from which to compare thread patterns. Thus, not as much context information may be required to identify which thread pattern may be causing the execution error. However, code debugging manager 310 does not require that the application code 334, or an instance of the application code 334, or a different version of the application code, be identified to have passed a prior execution test (e.g., be benchmark code) for thread variance debugging analysis. Code debugging manager 310 is configured to identify thread variances resulting from multiple instances of the code executing in parallel, regardless of any benchmark tested code. It is the identified variances between the multiple instances executing in parallel in real-time, and relative thread and execution context information, which provides improved debugging without requiring any previously executed benchmark version of code to compare against.

The context information and breakpoint manager 330 identifies and captures execution context information and data relative to execution of the application code 334 in the computing system environment (e.g., processor 302, memory 308, operating system), and specifically relative to the plurality of threads being executed for which the thread pattern manager 328 identifies thread patterns. The execution context information may include parameters passed, stack data, function calls, identification of specific aspects of the code that called a thread, data transmitted and/or received (e.g., web pages, scripts), objects, register content, or any combination thereof that will assist in the debugging process, and especially relative to thread pattern variances identified. Execution context information may be captured using a protocol analyzer or internal hooking, or an operating system analysis tool, such as a Linux operating system event-oriented observability tool, e.g., "perf." This allows for tracking additional information such as performance counters, events, trace points, tasks, workload, control-flow, cache misses, page faults, threads, and other profiling aspects of the operating system to provide a robust reference perspective of the operating system configuration state and context of execution of the application code 334.

The thread variance manager 332 compares (typically in real-time) the thread patterns identified in the comparative representation generated by the thread pattern manager 328, and identifies a variance (or variances) between the thread patterns. The variance is typically indicative of a bug in the code, and may be used to identify possible code that may be causing the bug. The comparison may be performed relative to the context defined for storing and identifying the thread patterns as previously described, e.g., a table, matrix, or linear configuration, and may include comparing relevant descriptive information regarding the thread patterns, such as device identification information, thread identification, thread timing information, stack trace information, and/or the like. Responsive to the comparison and identified variance, a user may inspect the code in more detail, and execution context information captured, at breakpoints relevant to the threads and/or variances identified, as noted by the context information and breakpoint manager 330.

Note also that code debugging manager 310 may execute debugging and monitoring of thread patterns associated with individual groups of tests on the application code 334, or on a whole system test of the application code 334. For example, the code debugging manager 310 may start and stop thread monitoring or recording so that a thread pattern can be associated with a specific group of tests, or initiate the start of individual groups of tests.

Figure 4:
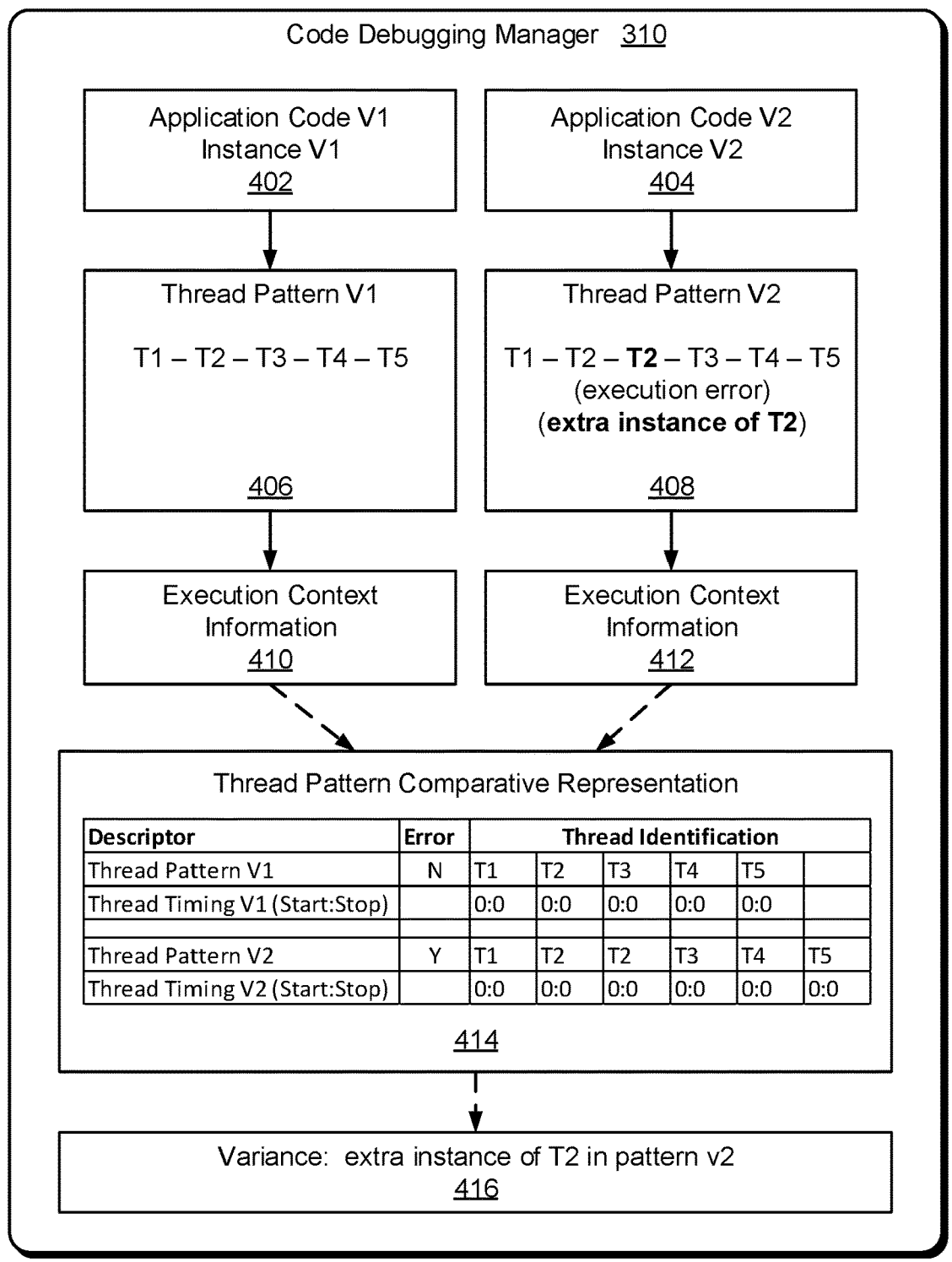
FIG. 4 is a block diagram illustrating an example code debugging manager for thread patterns relative to two instances of execution of the code.

FIG. 4 is a block diagram 400 illustrating an example code debugging manager 310 configured to debug code using thread patterns relative to two instances of code 402, 404, executing in parallel. Application code version V1, instance V1 402, executes on a computing device. Application code version V2, instance V2 404, also executes on a computing device in parallel with V1 (e.g., V2 begins executing prior to V1 completing executing). As discussed above, the computing device executing each instance may be a same processor core or processor, or one or more different processor cores or processors, or may be a client, a server, a distributed computing system, virtual machine, or combination thereof. Thread data is continually captured to identify resulting thread pattern V1 406 and resulting thread pattern V2 408 from each execution. Respective execution context information 410 and 412 is also optionally captured. A thread pattern comparative representation 414 is then generated. The thread patterns are compared using the comparative representation 414 to identify a variance 416 in the patterns. Breakpoints may be set in the code debugging manager 310 to break at each thread identified, and/or at the variance, to assist in identifying possible areas within the code that may be problematic.

If an execution failure is detected 408 (e.g., an error is generated, such as a lockup, thrown exception, crash, memory fault, missing command, communication error, control flow, display error, stack overflow), such error may facilitate identifying the problem thread pattern V2 relative to the thread pattern V1 that had no execution error. If the execution error is of a type that makes it difficult to determine which thread pattern had the error, the execution context information 410, 412, may be referenced to determine the failed thread path. Additionally, when a variance is detected, a screen shot of the application may be captured and presented as part of the context information (e.g., the data returned from the server in a client/server context around the time of the thread variance).

In this example block diagram 400, instance V1 402 generates a thread pattern V1 identified as T1-T2-T3-T4-T5 at block 406. On the other hand, instance V2 404 generates a thread pattern V2 identified as T1-T2-T2-T3-T4-T5 at block 408. This thread pattern V2 includes an extra instance of execution of thread T2, relative to the thread pattern V1. Responsive to identifying each thread pattern V1 406, and V2 408, and detecting an execution error 408 in this example, and also optionally capturing execution context information 410, 412, a comparative representation 414 of the thread patterns is generated. In this example, the comparative representation is illustrated in a table format for easily identifying each thread pattern relative to the other. The comparative representation may also include thread timing for each thread pattern, stack trace information, and/or other execution context information. The comparative representation 414 also enables any variance to be easily identified. In this example, the extra instance of thread T2 in thread pattern V2 is identified and reported as the variance 416. This variance indicates that the code associated with whatever function calls T2 in application code V2, instance V2 404, may have some kind of a problem.

This parallel testing of multiple instances of execution of the code allows for a generally real-time comparison of thread patterns to identify potential problems in the code. In another example, after the parallel execution, the thread patterns 406, 408, execution context information 410, 412, and/or the thread pattern comparative representation 414, are saved to memory or non-volatile storage for subsequent review and comparison for identifying the variance, adding or modifying breakpoints relative to the variance, specific threads, or patterns, and further debugging. Although in this example the actual code modification between application code versions V1 and V2 may be causing the failure, the variance in the thread pattern helps narrow the focus to identify the source of the problem. The user may further debug by identifying code changes relative to the actual thread variance in the two versions of code, and set debugger breakpoints relative to the variance to stop execution once a thread variance is detected. If the same version of code is being tested (e.g., if application code version V1 is executed as two separate instances), a comparison of the actual flow of the code between the two tests may be used relative to the variance detected.

When the thread variance occurred, the two different instances and different versions of code (or same version, depending on testing context) may be displayed to a user. Additional information to display may include the execution context information 410, 412, a list of function calls (or all the code) that were called when the thread variance occurred (before and after), versus function calls that were called when the thread variance did not occur. This information may be displayed side by side so that the code flow can be compared to better identify what actually caused the problem. The user may then continue using debugging procedures, such as single stepping through the application to identify bugs and set additional breakpoints, including setting breakpoints based on detection of a specific thread pattern, a single thread, or at the beginning or end of a specific thread, or the variance. This single stepping may include single stepping through each of the instances executing V1V2 (402/404) in parallel, or for all instances running, until the next thread executes for each instance.

In one embodiment of a single-step thread mode (defined by the user), the code debugging manager 310 starts two tests, e.g., application code V1 instance V1 402 and application code V2 instance V2 404 (but may be more), in parallel, and then single steps, based on thread execution, through the application code of one or both of the instances V1/V2 (402/404). In this single-step thread mode example, the code debugging manager 310 breaks after the thread T1 executes on the application code instances V1/V2 (402/404) and then shows the execution context information 410/412 for thread T1 to the user. Likewise, when T2 first executes in the application code instances V1/V2 (402/404), the code debugging manager 310 breaks and shows the execution context information 410/412 for T2 to the user. This process then continues where T3(V1)/T2(V2) are then executed (the variance). The execution context information 410/412 can be displayed for each thread step for the two threads (e.g., T3(V1)/T2(V2)). The process then continues for the remaining threads if the user so chooses.

The thread patterns V1 406, and V2 408, and execution context information 410/412 for each thread step (whether in regular mode or the single-step thread mode) may be stored (e.g., in non-volatile storage 338) and later replayed to the user. This allows the user to single step through the thread steps even after the application code instances V1/V2 (402/404) have completed execution.

In another embodiment, the code debugging manager 310 can be set to automatically break based on the thread variance. For example, as shown in FIG. 4, the code debugging manager 310 will cause the system to break when the variance between T3(V1)/T2(V2) is first discovered.

Figure 5:
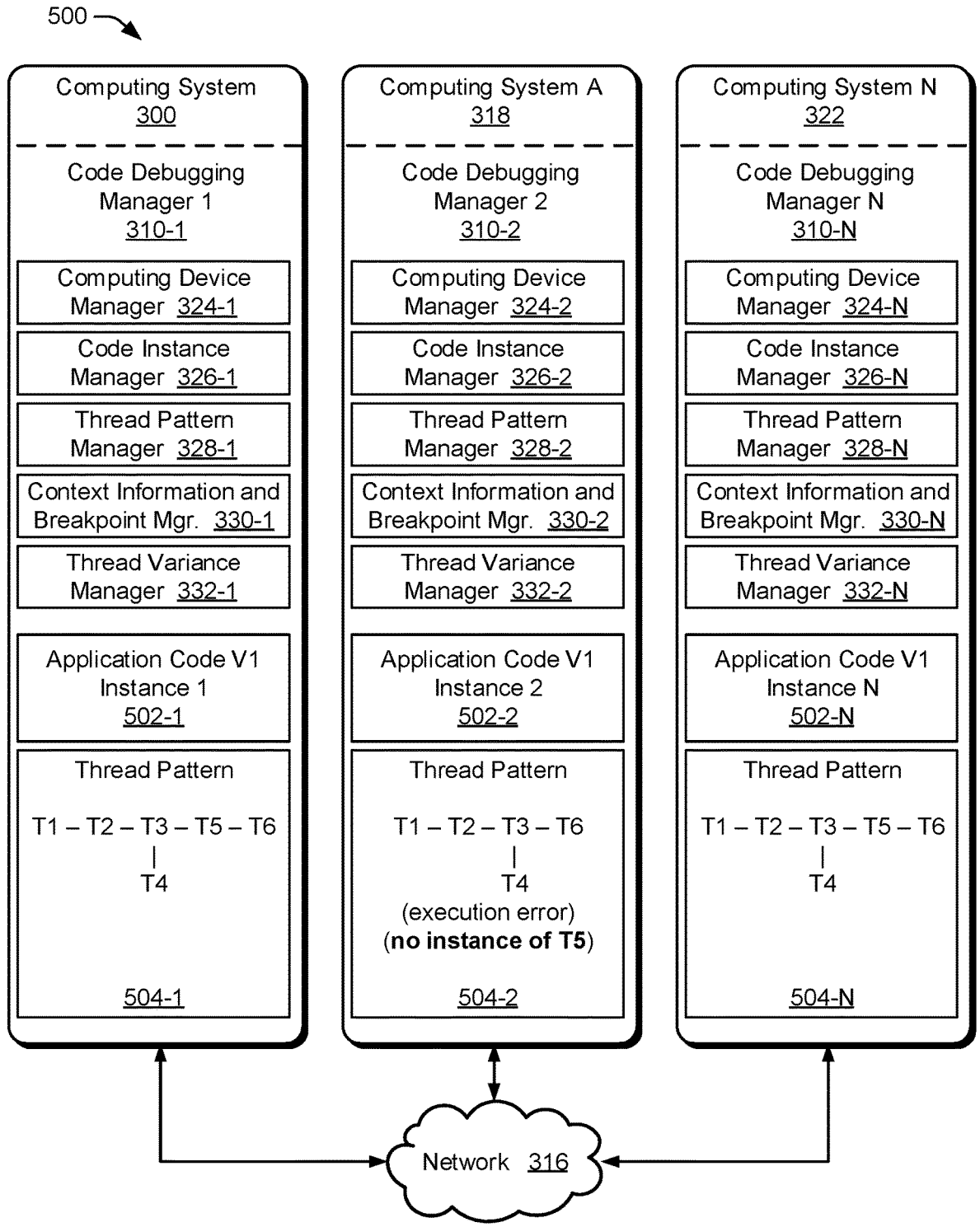
FIG. 5 is a block diagram illustrating an example configuration of multiple instances of code debugging managers configured to debug code using thread patterns relative to multiple instances of execution of the code in a multiple computing system environment.

FIG. 5 is a block diagram illustrating an example configuration 500 of multiple instances of the code debugging manager 310-1, 310-2, 310-N, configured on multiple computing systems 300, 318, 322, to debug code using thread patterns relative to the multiple instances of the code executing in parallel. Each of the computing systems 300, 318, 322 represents a computing system as previously described in reference to FIG. 3. Each code debugging manager 310-1, 310-2, 310-N represents an instance of the code debugging manager 310 as previously described in reference to code debugging manager 310 of FIG. 3. As such, each code debugging manager 310-1, 310-2, 310-N includes manager-modules similar to those described in FIG. 3, including a computing device manager 324, code instance manager 326, thread pattern manager 328, context information and breakpoint manager 330, and thread variance manager 332.

In this example configuration 500, the computing system 300 and code debugging manager 310-1 may be configured as a master system for managing and coordinating with computing systems 318 and 322 for parallel debugging using thread patterns of multiple instances of application code V1 502-1, 502-2, and 502-N. Application code V1 is loaded (or otherwise made available, e.g., cloud or Software as a Service (SaaS) model) for execution on each computing system as a separate instance, e.g., instance 1 502-1, instance 2 502-2, and instance N 502-N. Each code debugging manager 310-1, 310-2, 310-N, functions according to the methods previously described to identify thread patterns 504-1, 504-2, and 502-N relevant to the respective application code instance executing 502-1, 502-2, 502-N, on the respective computing system. Each instance of code runs in parallel relative to the other instances of code, meaning instance 2 and instance N execute relative to instance 1 either synchronously or asynchronously, provided instance 2 and instance N begin executing prior to instance 1 completing its executing.

The thread pattern manager 328-1, 328-2, 328-N on each respective computing system identifies the thread patterns resulting from the application code instance executing on each respective system. The thread pattern manager 328-1 on the master computing system 300 generates a comparative representation of the respective thread patterns 504-1, 504-2, 504-N from each of the instances of the applications as they run in parallel, either generally in real-time or after the executions complete. The thread variance manager 332-1 on the master computing system 300 then identifies a variance in the thread patterns relative to the comparative representation generated. Note also, as shown in configuration 500, identifying thread patterns from multiple instances of code executing in parallel can also work for multi-threaded applications. For example, threads T3-T4 are threads that run in parallel to each other, but on separate processor cores of each respective computing system 300, 318, 322.

In this example configuration 500, an execution error is detected with instance 2 502-2, indicating instance 2 has failed, while the other instances 502-1 and 502-N passed the same execution test of application code V1. A variance in the thread pattern of instance 2 is identified relative to the thread patterns of instance 1 and instance N. In comparing the thread patterns, the T5 thread is not executed in the instance 2 that failed. Although not depicted as an error in this example, if T3-T4 in the failed application were executed in series on the same core versus being executed in parallel on different cores as shown, it would be noted as a variance in the thread pattern.

When a thread execution completes, or a thread variance occurs, the context information captured by the context information and breakpoint manager 330-1, 330-2, 330-N, may be displayed comparing the context information from the passed instance 1 502-1 or N 502-N, to that of the failed instance 2 502-2. For example, the amount of executed code, or the time of executed code identified from when the thread pattern varied may be displayed to identify a potential code path between the thread variance, stack trace information, the actual failure, and/or the like. Breakpoints may also be set in each respective code debugging manager 310 to detect thread patterns within a single instance. Additionally, by coordinating through the master code debugging manager 310-1, because thread patterns between instances can be detected, a breakpoint can be set when a first thread in instance 1 occurs and a second thread in instance 2 occurs, and so forth.

The above processes can also be implemented across computing systems 300, 318, 322 in a client/server, multiple instance, and parallel execution context. Namely, a thread pattern of a client/server that passes an execution run can be compared to a thread pattern of a client/server that fails an execution run. Alternatively, a thread pattern of a client/server execution run can be compared to a thread pattern of a separate client/server execution run, regardless of any prior benchmark testing (e.g., regardless of whether any client/server execution previously passes an execution run).

To identify a thread pattern in a client/server context, the code debugging manager 310 identifies threads resulting from an instance of the application code 502 executing on the client computing device, and coordinates those threads with the threads identified as resulting from an instance of the application code executing on the server computing device. The code debugging manager identifies a thread pattern that represents threads resulting from both the client computing device and the server computing device in relative coordination. For example, assume C represents a thread on a client and S represents a thread on a server. Assume on the client/server configuration that the client thread pattern C1-C2-C3 and the server thread pattern S1-S2-S3 (parallel thread patterns) pass an execution test. And assume a separate execution of the client thread pattern C1-C2-C4 and the server thread pattern S1-S2-S4 fail an execution test. The thread variance manager 332 of a designated (e.g., master) system compares the patterns to identify the thread variance of C4/S4 on the failed execution versus C3/S3 on the passed execution run. This client/server thread pattern variance information is helpful in determining if the client and/or server is causing the problem. In a similar manner as discussed above, a breakpoint can be used when the thread variance occurs either in the client and/or the server. Also, depending on where the failure occurred, code (or any context information) from either the client and/or server can be displayed. Timing data associated with the threads may also be captured and displayed to show the synchronization (or lack of) between the threads in the client/server context.

Alternatively, the process could be a sequence of client/server tests. For example, a passed execution test may be C1-S1-C2-S2-S3-C3, and a failed execution test may be C1-S4-C2-S2-S3-C3. In this context, the code debugging manager 310 identifies the thread variance of S4 in the failed test instead of S1 in the test that passed. In addition, the above processes could be implemented in multi-application tests where multiple applications are being tested in serial and/or parallel.

The client/server thread patterns can also use the single-step thread mode previously discussed. For example, the user may single step through the steps C1, S1/S4 (the variance) C2, S2, etc. in the same manner as described above. The context information can then be displayed to the user as the user single steps based on the threads.

While this disclosure has been described with respect to example embodiments outlined above, it is evident that alternatives, modifications and variations will be apparent to those skilled in the art. Accordingly, the described and depicted examples of the present disclosure are intended to be illustrative, not limiting, and the subject of the appended claims is not necessarily limited to the specific features or methods described herein.

What is claimed is:

1. A method of debugging code, comprising:
   executing, by at least a first computing device, a first instance of code;
   identifying a first thread pattern indicative of a first plurality of threads of execution of the first instance of the code;
   executing, by at least one of the first computing device or a second computing device, a second instance of the code, the second instance of the code beginning executing prior to the first instance of the code completing executing,
   wherein the first instance of the code and the second instance of the code are executed in an overlapping time frame;
   identifying a second thread pattern indicative of a second plurality of threads of execution of the second instance of the code;
   generating a comparative representation of the first thread pattern and the second thread pattern relative to each other in real-time; and
   identifying a variance between the first thread pattern and the second thread pattern relative to the comparative representation.

2. The method of claim 1 further comprising setting a single-step thread debugging mode that single steps based on at least one of the first plurality of threads of execution, the second plurality of threads of execution, both the first plurality of threads of execution and the second plurality of threads of execution in parallel, or the variance.

3. The method of claim 1 further comprising:
   the first instance of the code comprising a first client instance and a first server instance, and wherein the first thread pattern is indicative of a first plurality of threads of execution relative to the first client instance and the first server instance in a relative coordination; and
   the second instance of the code comprising a second client instance and a second server instance, and wherein the second thread pattern is indicative of a second plurality of threads of execution relative to the second client instance and the second server instance in a relative coordination.

4. The method of claim 1 further comprising filtering out a thread of execution of operating system code related functionality to identify at least one of the first thread pattern or the second thread pattern.

5. The method of claim 1 further comprising capturing execution context information relative to the first plurality of threads and the second plurality of threads, the execution context information comprising at least one of a parameter passed, stack data, function call, identification of specific aspects of the code that called a thread, data transmitted, data received, object, or a combination thereof.

6. The method of claim 5 further comprising:
   setting a debugging breakpoint relative to at least one of a thread of the first plurality of threads of execution, a thread of the second plurality of threads of execution, or the variance; and
   referencing the execution context information at the debugging breakpoint.

7. The method of claim 1 further comprising storing into a non-volatile memory at least one of the comparative representation of the first thread pattern and the second thread pattern, the variance between the first thread pattern and the second thread pattern, a thread execution context information, a debugging breakpoint, or a combination thereof.

8. The method of claim 1 wherein the first plurality of threads of execution comprises an execution that passes an execution test relative to a first version of the code, and the second plurality of threads of execution comprises an execution relative to the first version of the code or a second version of the code that is different from the first version of the code.

9. The method of claim 1 further comprising:
   capturing execution context information relative to the first plurality of threads and the second plurality of threads;
   setting a single-step thread debugging mode relative to at least one of the first plurality of threads of execution, the second plurality of threads of execution, both the first plurality of threads of execution and the second plurality of threads of execution in parallel, or the variance; and
   further debugging the code by referencing the single-step thread debugging mode and execution context information after completing executing of the first instance of the code and the second instance of the code.

10. The method of claim 1 further comprising at least one of setting or modifying a thread debugging breakpoint relative to at least one of:
- a specific thread occurring a first time relative to at least one of the first plurality of threads or the second plurality of threads;
- a specific thread occurring in both the first plurality of threads and the second plurality of threads;
- a specific thread occurring a specified number of times relative to at least one of the first plurality of threads or the second plurality of threads;
- a specific thread occurring a specified number of times in both the first plurality of threads and the second plurality of threads;
- a first specific thread occurring in the first plurality of threads, and a second specific thread occurring in the second plurality of threads;
- a beginning of a specific thread occurring relative to at least one of the first plurality of threads or the second plurality of threads;
- an end of a specific thread occurring relative to at least one of the first plurality of threads or the second plurality of threads; or
- the variance.

11. The method of claim 1 further comprising:
- executing at least a third instance of the code, the at least a third instance of the code beginning executing prior to the first instance of the code completing executing;
- identifying at least a third thread pattern indicative of at least a third plurality of threads of execution of the at least a third instance of the code;
- generating a comparative representation of the first thread pattern, the second thread pattern, and the at least a third thread pattern relative to each other; and
- identifying a variance between at least one of the first thread pattern, the second thread pattern, or the at least a third thread pattern.

12. A code debugging system comprising a first computing device and instructions that when executed by the first computing device cause the first computing device to:
- execute a first instance of code;
- identify a first thread pattern indicative of a first plurality of threads of execution of the first instance of the code;
- receive data relative to a second instance of the code, the second instance of the code beginning executing on at least one of the first computing device and a second computing device prior to the first instance of the code completing executing,
- wherein the first instance of the code and the second instance of the code are executed in an overlapping time frame;
- identify a second thread pattern indicative of a second plurality of threads of execution of the second instance of the code;
- generate a comparative representation of the first thread pattern and the second thread pattern relative to each other in real-time; and
- identify a variance between the first thread pattern and the second thread pattern relative to the comparative representation.

13. The code debugging system of claim 12 further comprising instructions that when executed by the first computing device cause the first computing device to set a single-step thread debugging mode that single steps based on at least one of the first plurality of threads of execution, the second plurality of threads of execution, both the first plurality of threads of execution and the second plurality of threads of execution in parallel, or the variance.

14. The code debugging system of claim 12 wherein the first instance of the code comprises a first client instance and a first server instance, and the second instance of the code comprises a second client instance and a second server instance, and further comprising instructions that when executed by the first computing device cause the first computing device to:
- receive data relative to the first client instance and the first server instance, wherein the first thread pattern is indicative of a first plurality of threads of execution relative to the first client instance and the first server instance in a relative coordination; and
- receive data relative to the second client instance and the second server instance, wherein the second thread pattern is indicative of a second plurality of threads of execution relative to the second client instance and the second server instance in a relative coordination.

15. The code debugging system of claim 14, further comprising instructions that when executed by the first computing device cause the first computing device to enter a single-step thread debugging breakpoint mode relative to at least one of the first thread pattern, the second thread pattern, both the first thread pattern and the second thread pattern in parallel, or the variance.

16. The code debugging system of claim 12 further comprising instructions that when executed by the first computing device cause the first computing device to capture execution context information relative to at least one of the first plurality of threads or the second plurality of threads, the execution context information comprising at least one of a parameter passed, stack data, function call, identification of specific aspects of the code that called a thread, data transmitted, data received, object, or a combination thereof.

17. The code debugging system of claim 16 further comprising instructions that when executed by the first computing device cause the first computing device to:
- set a debugging breakpoint relative to at least one of a thread of the first plurality of threads of execution, a thread of the second plurality of threads of execution, or the variance; and
- reference the execution context information at the debugging breakpoint.

18. The code debugging system of claim 12 wherein the first plurality of threads of execution comprises an execution that passes an execution test relative to a first version of the code, and the second plurality of threads of execution comprises an execution relative to the first version of the code or a second version of the code that is different from the first version of the code.

19. The code debugging system of claim 12 further comprising instructions that when executed by the first computing device cause the first computing device to:
- capture execution context information relative to the first plurality of threads and the second plurality of threads;
- set a single-step thread debugging mode relative to at least one of the first plurality of threads of execution, the second plurality of threads of execution, both the first plurality of threads of execution and the second plurality of threads of execution in parallel, or the variance; and
- reference the single-step thread debugging mode and execution context information after completing executing of the first instance of the code and the second instance of the code.

20. A non-transitory machine-readable storage medium storing instructions that when executed by at least one computing device cause the at least one computing device to:
- execute a first instance of code;
- identify a first thread pattern indicative of a first plurality of threads of execution of the first instance of the code;
- receive data relative to a second instance of the code, the second instance of the code beginning executing on at least one of the at least one first computing device or a second computing device prior to the first instance of the code completing executing,
- wherein the first instance of the code and the second instance of the code are executed in an overlapping time frame;
- identify a second thread pattern indicative of a second plurality of threads of execution of the second instance of the code;
- generate a comparative representation of the first thread pattern and the second thread pattern relative to each other in real-time; and
- identify a variance between the first thread pattern and the second thread pattern relative to the comparative representation.

* * * * *